United States Patent [19]
Schmidt

[11] 3,712,702
[45] Jan. 23, 1973

[54] TELESCOPIC SIGHT FOR DAYLIGHT AND NIGHT OBSERVATION

[75] Inventor: Horst Schmidt, Wetzlar, Germany

[73] Assignee: Fa. Ernst Leitz GmbH, Wetzlar, Germany

[22] Filed: Sept. 30, 1970

[21] Appl. No.: 77,053

Related U.S. Application Data

[63] Continuation of Ser. No. 691,836, Dec. 19, 1967, abandoned.

[30] Foreign Application Priority Data

Dec. 21, 1966 Germany..............................L 55 323

[52] U.S. Cl. ..........................350/10, 350/8, 350/34, 350/48, 350/54, 350/212
[51] Int. Cl. .............................................G02b 27/32
[58] Field of Search..................350/8, 10, 34, 48–54, 350/11, 212

[56] References Cited

UNITED STATES PATENTS 3,407,302  10/1968  Bouwers................................350/34
3,380,335  4/1968  Clave et al........................350/212 X

FOREIGN PATENTS OR APPLICATIONS 255,128  7/1925  Great Britain..........................350/10
913,921  12/1962  Great Britain..........................350/49

Primary Examiner—David Schonberg
Assistant Examiner—Toby H. Kusmer
Attorney—Otto John Munz

[57] ABSTRACT

In a telescopic sight comprising two observation systems, one for use in daylight and one for use at night, means are provided for optically aligning either one of said observation systems with a light entry axis that is common to both systems. Further, an auxiliary lens system is disposed along said common light entry axis in front of said observation systems, said auxiliary means being adapted to displace the entrance pupils of said observation systems along said light entry axis in a forward direction. In specific embodiments of the invention a reticule and/or prismatic elements are part of the auxiliary lens system. The prismatic elements are disclosed to be adjustable to vary the direction of view of the telescope.

1 Claim, 3 Drawing Figures

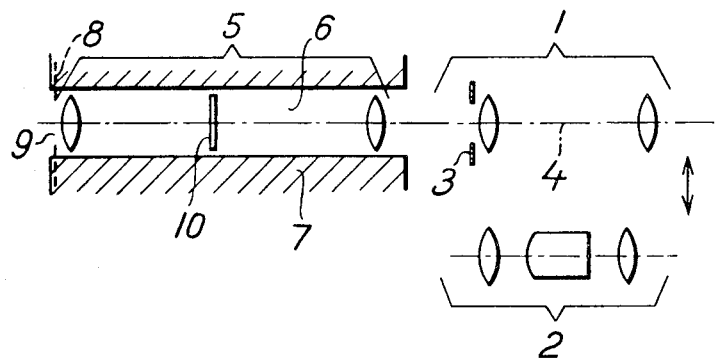
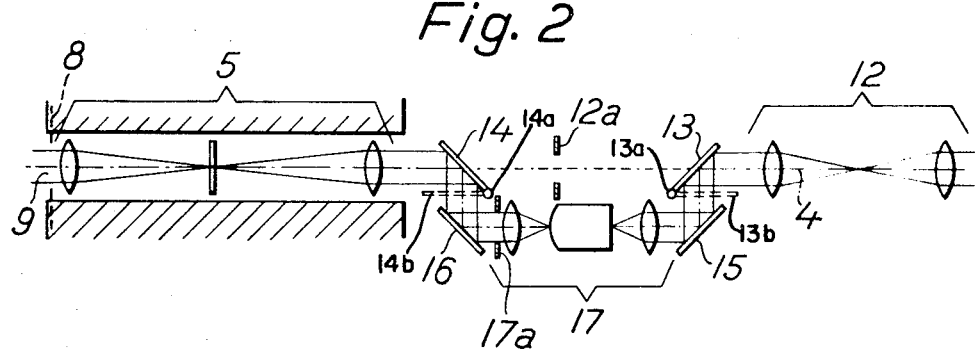
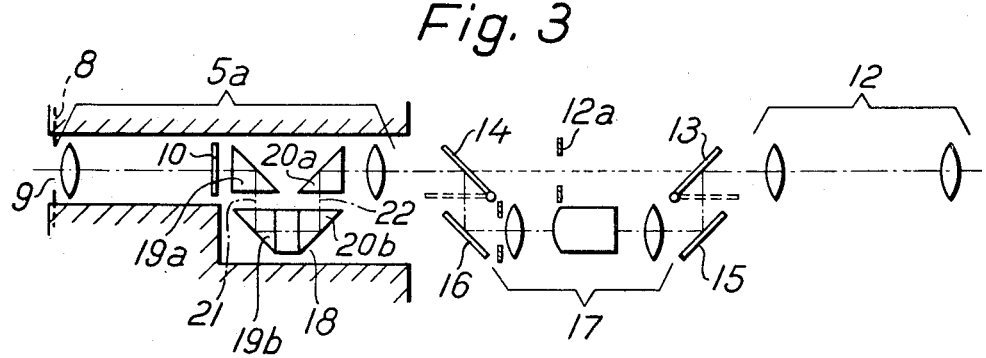

3,712,702

TELESCOPIC SIGHT FOR DAYLIGHT AND NIGHT OBSERVATION

CROSS-REFERENCE TO RELATED APPLICATIONS

This application is a continuation of U.S. application Ser. No. 691,836, filed Dec. 19, 1967 now abandoned.

BACKGROUND OF THE INVENTION

1. Field of the Invention

The present invention pertains to telescopic sights. More particularly, the invention pertains to telescopic sights for day and night observation mounted in tanks, armored cars or the like.

2. Description of the Prior Art

Telescopic sights comprising two observation systems and further comprising means for aligning each of said systems with the light entry axis are well known in the art. In order to obtain best possible observation conditions the means for aligning the systems with the light entry axis are arranged in the forward portion of the telescope. Here and throughout the specification and claims the term "forward" is used for a direction towards the object to be observed. Arrangement of said aligning means in the forward portion of the telescope is difficult, however, if the telescope is mounted inside a room, for example inside of a tank. Since said aligning means are rather bulky, particularly if compared to the rear portion of the telescope which comprises the only ocular to be used with the day observation system as well as with the night observation system, it proves necessary to displace either said aligning means alone or the whole telescope more into the interior of the room, relative to the light entry opening, i.e. the opening in the armor plates. Thereby the distance of the entrance pupil of the telescope is also displaced relative to the light entry opening.

Similar difficulties arise if besides the aligning means additional prismatic elements are provided by means of which the direction of observation may be varied. This difficulty can, again, only be overcome if the telescope and thereby its entrance pupil is mounted more in the direction of the interior of the room. However, this mounting more in the interior of the room can also often not be accomplished on account of the limited space inside those rooms.

SUMMARY OF THE INVENTION

It is therefore an object of the invention to overcome the above mentioned difficulties. It is a further object to provide a telescopic sight which may be used behind the armor plate of a tank without the necessity of mounting the telescope too far in the direction of the middle of the tank dome.

According to the invention these objects are achieved by disposing an auxiliary lens system along the light entrance axis by means of which the entrance pupils of both observation systems are displaced in a forward direction. The entrance pupil may even be displaced directly in the light entrance opening of the armor plate thereby ensuring the best possible observation conditions, i.e. the widest viewing angle.

If it is desired to provide the telescopic sight with a reticule or with prismatic elements, the latter being adapted to vary the direction of observation, said reticule and/or said prismatic elements may readily be incorporated into the auxiliary system.

BRIEF DESCRIPTION OF THE DRAWINGS

The invention will be more readily comprehended from the following description when taken in conjunction with the appending drawings wherein FIG. 1 is a schematic sectional view of the front portion of a telescopic sight comprising two observation systems, and also of the auxiliary lens system, FIG. 2 shows an embodiment of the invention in which changeover of the observation systems is accomplished optically, FIG. 3 shows an embodiment of the invention according to FIG. 2, wherein additional prismatic elements are provided for varying the direction of observation.

Referring now to FIG. 1, there is shown a telescopic sight comprising an auxiliary lens system 5, inserted in an opening 6 in a wall 7, which may be the armor plating of a military vehicle. The entrance pupil 8 of the auxiliary lens system virtually coincides with the front entry 9 of the opening 6.

A day observation system is shown at 1 (shown positioned on the optical axis of the auxiliary lens system) and is interchangeable with a night observation system 2. The image of the entrance pupil 8 is formed in the entrance pupil 3 of the day observation system. Numeral 10 indicates a reticule in the auxiliary lens system.

FIG. 2 shows a telescopic sight in which changeover of the observation systems for night and day use is accomplished optically as opposed to the mechanical arrangement used in FIG. 1. This changeover is effected by means of mirrors 13 and 14, said mirrors being pivotable about axis 13a and 14a to positions indicated in dotted lines at 13b and 14b. In the positions shown in FIG. 2, the mirror 14 is positioned transverse to the light path of light passing through the auxiliary lens system 5 and reflects the light by way of a fixed mirror 16, through the night optical system 17, whereupon fixed mirror 15 and the mirror 13 deflects the light back into its original path so that it passes through the day observation system 12. With the mirrors 13 and 14 in the position indicated at 13b and 14b light will pass directly from the auxiliary lens system through the day observation system 12, thus providing day vision. Thus, effectively, night vision is obtained by inserting into the light path of the day system a night optical system.

The entrance pupils of both observation systems, which are positionally adapted to each other in relation to the auxiliary lens system 5, are indicated at 12a and 17a. The auxiliary lens system has a simple magnification and serves, as it does in the case of FIG. 1, to bridge the gap between the entrance pupils of the day and night optical systems and the actual light entry opening 9.

In the form of the invention shown in FIG. 3, an identical changeover system for night and day use is used, but in this case, the sight is provided in addition, with prisms 19a, 19b, 20a and 10b. The prisms are rotatable about axis 21 or 22, so that a change of direction of view is achieved in conventional manner.

It will be appreciated that various modifications may be made to the above described embodiments without departing from the scope of the invention. For example, where single lenses are indicated, these may well be replaced by more complex lens systems as required. The mirrors 13 to 16 may, if desired, be replaced by prisms.

In all cases, it is desirable that the sight be corrected for the range of spectrum encountered in one or other of the two observation conditions and for most purposes it is desirable that this correction should be for visible light.

From the above described embodiments of the invention, it will be seen that the invention provides a telescopic sight which is particularly suitable for use in armored military vehicles, such as tanks and armored cars, in which only minimum openings in the armor plate are desired, and where interior space is at a premium. By use of the invention, only a single aperture in the armor plate is required for telescopic sights, all changeover between night and day observation systems being carried out within the interior of the vehicle. Changeover of the systems can be carried out quite simply without the necessity of unduly enlarging the total size of the apparatus.

The provision of the auxiliary lens system in the armor plate itself enables the entrance pupils of both observation systems to be moved towards the exterior of the vehicle and by thus bridging the gap between the exterior of the vehicle and the entrance pupil of the observation system, the entrance pupil can be positioned practically with the outside surface of the armor plating.

I claim:

1. In combination with an armored enclosure having a thick wall of armor plate wherein the wall has a light admitting passage of small diameter to permit observation from within the enclosure, a telescopic apparatus comprising:
A. An auxiliary lens system comprising:
   1. a first convex lens at the outer end of the opening,
   2. a second convex lens, the optical axis of which is aligned with the optical axis of the first lens, the second lens being adjacent to the inner end of the opening wherein light rays leaving the second lens are parallel to one another,
B. A day observation system comprising:
   1. a third convex lens the optical axis of which is aligned with the optical axis of the auxiliary lens system,
   2. a fourth convex lens the optical axis of which is aligned with the third lens,
C. A night observation system comprising:
   1. a fifth convex lens,
   2. an image intensifier the optical axis of which is aligned with the fifth lens,
   3. a sixth convex lens the optical axis of which is aligned with the image intensifier, wherein the optical axis of the night observation system is parallel to the optical axis of the day observation system,
D. Means for interposing the night observation system between the auxiliary lens system and the day observation system said means comprising:
   1. a first fixed mirror before and at 45° to the optical axis of the fifth lens,
   2. a second fixed mirror behind and at 45° to the optical axis of the sixth lens,
   3. a first movable mirror pivotally positionable,
      a. in a first position behind the second lens of the auxiliary lens system at 45° to the optical axis of the second lens in alignment with the first fixed mirror, and
      b. in a second position out of alignment with the optical axis of the auxiliary lens system,
   4. a second movable mirror pivotally positionable,
      a. in a first position before the third lens of the day observation system at 45° to the optical axis of the third lens in alignment with the second fixed mirror, and
      b. in a second position out of alignment with the optical axis of the day observation system, wherein day viewing is accomplished while the movable mirrors are each in the second position, wherein night viewing is accomplished while the movable mirrors are each in the first position; wherein parallel rays from the second lens strike the first movable mirror then the first fixed mirror before entering the night observation system; wherein parallel rays leaving the night observation system strike the second fixed mirror and the second movable mirror before entering the day observation system; said armor plate wall having a thickness in excess of the length of the telescopic apparatus in which said auxiliary lens system is disposed within said opening in said armor plate wall; said opening in said armor plate wall being of insufficient cross-section to accomodate the passage of said telescopic apparatus.

* * * * *